United States Patent [19]

Adams et al.

[11] 4,343,909

[45] Aug. 10, 1982

[54] HIGH TOUGHNESS CERAMIC CUTTING TOOL

[75] Inventors: James H. Adams, Rochester; Dennis J. Rich, Troy; Frederick C. Holtz, Jr., Birmingham, all of Mich.

[73] Assignee: The Valeron Corporation, Troy, Mich.

[21] Appl. No.: 259,581

[22] Filed: May 1, 1981

Related U.S. Application Data

[63] Continuation-in-part of Ser. No. 141,103, Apr. 17, 1980, abandoned.

[51] Int. Cl.³ .................. C04B 35/48; C04B 35/58; C04B 35/49
[52] U.S. Cl. ............................. 501/98; 51/309; 501/153
[58] Field of Search .................. 51/309; 501/98, 153

[56] References Cited

U.S. PATENT DOCUMENTS

| | | | |
|---|---|---|---|
| 3,542,529 | 11/1970 | Bergna et al. | 75/203 |
| 3,705,025 | 12/1972 | Daniels | 51/307 |
| 4,022,584 | 5/1977 | Rudy | 51/309 |
| 4,063,908 | 12/1977 | Ogawa et al. | 51/309 |

OTHER PUBLICATIONS

Rosenfield, A. R., "Progress Towards Tough, Creep-Resistant Ceramics", Metals & Ceramic Information Center Bulletin, Issue No. 105, Nov. 27, 1981.

*Primary Examiner*—Mark Bell
*Attorney, Agent, or Firm*—Robert S. Alexander

[57] ABSTRACT

Extremely tough, strong and wear resistant cold pressed and sintered inserts consisting essentially of from about 4 to 20% zirconia, from about 1–15% titanium diboride, and up to about 10% grain growth inhibiting sintering aid with the balance being alumina.

14 Claims, No Drawings

HIGH TOUGHNESS CERAMIC CUTTING TOOL

This application is a continuation-in-part of Ser. No. 141,103, filed Apr. 17, 1980 (now abandoned).

Alumina has been used in cutting tools because it is extremely hard and wear resistant. Substantially pure alpha alumina has gained widespread acceptance for light finishing cuts at high speeds but it has not been possible to use aluminum oxide tools in many applications which required heavy or medium duty cuts because it is extremely brittle.

There have been numerous efforts to improve the toughness of alumina while not seriously degrading its wear resistance. These attempts are detailed in the following references:

Nils Claussen, et al., CERAMIC BULLETIN, Vol. 56, No. 6 (1977), *Effect of Induced Microcracking on the Fracture Toughness of Ceramics.*

D. Greve, et al., CERAMIC BULLETIN, Vol. 56, No. 5 (1977), *Thermal Diffusivity/Conductivity of Alumina with a Zirconia Dispersed Phase.*

Nils Claussen, JOURNAL OF THE AMERICAN CERAMIC SOCIETY, Vol. 59, No. 1–2, January–February 1976, *Fracture Toughness of $Al_2O_3$ with an Unstabilized $ZrO_2$ Dispersed Phase.*

Roll Turning and Resurfacing with Oxide-Carbide Ceramics, by F. C. Holtz and F. L. Froberg. The Valeron Corporation, presented at New Developments in Tool Materials and Application Symposium on Mar. 21–22, 1977, Chicago.

U. Dworak et al., Ber. Dt. Keram. Ges. 55 (1978) Nr. 2; *Mechanical Strengthening of Multiphase Ceramics as Illustrated by the $ZrO_2$-$ZrO_2$/$Al_2O_3$-$ZrO_2$/$Al_2O_3$-TiC Systems.*

UNITED STATES PATENTS

U.S. Pat. No. 2,849,305 Frost Aug. 26, 1958
U.S. Pat. No. 3,313,605 Gill Apr. 11, 1967
U.S. Pat. No. 3,369,877 Humenik et al. Feb. 20, 1968
U.S. Pat. No. 3,409,416 Yates Nov. 5, 1968
U.S. Pat. No. 3,409,419 Yates Nov. 5, 1968
U.S. Pat. No. 3,454,385 Amero July 8, 1969
U.S. Pat. No. 3,502,447 Daniels Mar. 24, 1970
U.S. Pat. No. 3,507,631 Yates Apr. 21, 1970
U.S. Pat. No. 3,542,529 Bergna et al. Nov. 24, 1970
U.S. Pat. No. 3,580,708 Ogawa et al. May 25, 1971
U.S. Pat. No. 3,652,304 Daniels Mar. 28, 1972
U.S. Pat. No. 3,705,025 Daniels December, 1972
U.S. Pat. No. 3,926,567 Fletcher (Phillips) Dec. 16, 1975
U.S. Pat. No. 3,953,177 Sedlatschek et al. Apr. 27, 1976
U.S. Pat. No. 4,022,584 Rudy May 10, 1977
U.S. Pat. No. 4,063,908 Ogawa et al. Dec. 20, 1977
U.S. Pat. No. 4,157,898 Walker et al. June 12, 1979
U.S. Pat. No. 4,194,887 Ueltz et al. Mar. 25, 1980
British Pat. No. 955,887 Norton Company Apr. 22, 1964

The most commercially significant of these attempts to toughen alumina has probably been the cutting tools which have been manufactured by combining aluminum oxide and titanium carbide. While these tougher tools are useable in many heavier applications which would chip alumina, the improved toughness has been obtained at the costs of increased manufacturing cost and decreased wear resistance. The increased manufacturing cost results principally from the fact that substantially pure alumina can be formed into a cutting tool by cold pressing and sintering if a very small amount of a sintering aid such as magnesia, chromia or yttria is included, but alumina-titanium carbide cutting tools seem to require hot pressing to consistently form a substantially fully dense product. Further, hot pressing is not a practical method for forming many shapes so there has been a need for a composition having toughness and wear resistance comparable to alumina-titanium carbide but which could be fabricated by cold pressing and sintering. This invention provides a cutting tool combining those advantages. The cutting tool of the present invention is formed by cold pressing and sintering a composition consisting essentially of: from about 4 to about 20% zirconia; from about 0.5% to about 15% titanium diboride; up to about 10% grain growth inhibiting sintering aid; and from about 60% to about 95% alumina. Throughout this application, all percentages are by volume unless it is stated to the contrary.

Preferably the amount of zirconia will be from about 1 to 12% and, more preferably, it will range between about 6 and 15% while the amount of titanium diboride will be from about 2 to about 12%.

Preferred tools of the present invention will consist essentially of:
from about 6 to about 15% zirconia;
from about 1 to about 15% titanium diboride;
up to about 2% grain growth inhibiting sintering aid; and
from about 65% to about 95% alumina More preferred tools of the present invention consist essentially of:
from about 6 to about 15% zirconia;
from about 1 to about 12% titanium diboride;
up to about 0.5% magnesium oxide;
up to about 2% titanium dioxide; and
from about 65% to about 95% alumina;

For applications where a good balance of oxidation resistance and resistance to chipping are required the most preferred tools of the present invention consist essentially of:
from about 6 to about 15% zirconia;
from about 1 to about 6.5% titanium diboride;
from about 80% to about 95% alumina;
up to about 2% titanium dioxide; and
up to about 0.5% magnesia Where resistance to oxidation is less important than resistance to chipping, the preferred tools of the present invention consist essentially of:
from about 2 to about 15% zirconia;
from about 5% to about 15% titanium diboride;
up to about 5% grain growth inhibiting sintering aid; and
from about 65% to about 94% alumina.

Especially desirable chip resistant tools can be formed from compositions consisting essentially of:
from about 6 to about 12% zirconia;
up to about 5% grain growth inhibiting sintering aid;
from about 5 to about 15% titanium diboride; and
from about 68% to about 91% alumina.

For a general purpose insert, the most preferred compositions consist essentially of:
from about 2 to about 4% titanium diboride;
from about 6 to about 12% zirconia;
from about 0.2 to about 1.5% titania;
up to about 0.5% magnesia; and
from about 85 to about 90% alumina.

Other useful compositions for cutting tools which can be formed by cold pressing and sintering include:
from about 1 to about 15% zirconia,
up to about 2% magnesia, from about 5% to about 20% titanium diboride,
up to about 10% titanium dioxide, and
from about 60% to about 94% alumina;
from about 4 to about 12% zirconia,
from about 5 to about 20% titanium diboride, and
from about 68% to about 91% alumina;
from about 2 to about 15% zirconia,
up to about 10% sintering aid,
from about 6% to about 20% titanium diboride, and
from about 65% to about 94% alumina;
from about 3 to about 12% zirconia,
up to about 10% sintering aid,
from about 6% to about 15% titanium diboride, and
from about 65% to about 94% alumina;
from about 2 to about 15% zirconia,
up to about 10% titania,
up to about 2% magnesia,
from about 6% to about 20% titanium diboride, and,
from about 65% to about 94% alumina;
from about 2 to about 4% titanium diborbide,
from about 6 to about 12% zirconia,
from about 0.3 to about 0.9% titania,
from about 0.01 to about 0.5% magnesia,
from about 85% to about 90% alumina.

Those skilled in the art of ceramics are familiar with the use of minor amounts of various additives to lower sintering temperatures while inhibiting grain growth. In particular, it appears that a combination of about 0.6% titania and 0.1% magnesia serves well as a grain growth inhibiting sintering aid. Other well known grain growth inhibiting sintering aids include: Magnesia, calcia, silica, titania, zirconium silicate, yttria, neodynia, hafnia, and mixtures thereof.

Those skilled in the art know how to mix ingredients having a grain growth inhibiting effect with sintering aids to achieve a grain growth inhibiting sintering aid and that excessive amounts of some of these components can have a grain growth accelerating effect.

It is an important advantage of the cutting tools of the present invention that they can be formed by cold pressing and sintering and that since sintering can be accomplished at temperatures under 1800° C., existing equipment can often be used. In many cases, sintering can be accomplished at a temperature of about 1550° C., although sintering at 1600° C.–1650° C. appears to provide satisfactory sintering more consistently.

While the exact microstructure of the final product will depend on many variables so that it is not feasible to give a detailed guide for every composition, those skilled in the art can achieve a satisfactory product by manipulating the initial particle size distribution, composition, sintering temperature, holding time, green density and the other similar variables usually encountered in determining procedures for consolidating a ceramic mix. In particular, the conditions for processing will be influenced strongly by the type of zirconia incorporated into the mix. If the usual commercial zirconia is used, it will usually be desirable to use more zirconia and to sinter at temperatures which are higher than those which would be desirable if ultra-fine zirconia were used. It is believed that the ultra-fine zirconia is more active and that will more easily form some solid solution with alpha alumina at relatively low temperatures. For the purposes of this invention, ultra-fine zirconia is defined as zirconia having an active surface area of about 14 square meters per gram as compared to commercial zirconia which usually has an active surface area of only about 2.2 square meters per gram. Both types of zirconia are currently available commercially.

The preparation of the ceramic composition of the present invention is achieved by providing the several constituents in the form of fine-sized powders of an average particle size usually less than about 10 microns, and preferably of an average size less than about 1 micron. The manners by which the powders can be comminuted to the requisite particle size are well known and can be achieved in accordance with prior art techniques. Typical of such techniques are those disclosed in U.S. Pat. No. 3,542,529, the substance of which is incorporated herein by reference. In view of the stability of the ingredients, extraordinary measures are not needed after milling to preserve purity.

Of course, it is understood by those skilled in the art that minor amounts of milling contaminants are picked up if cemented carbide inserts (balls) are used for milling but this can be tolerated so long as the amounts of cobalt and carbide contaminants do not become excessive.

Carefully measured amounts of the powder constituents within the permissible ranges are suitably blended to form a substantially uniform mixture whereafter a blank is formed by cold pressing and sintering in accordance with known prior art practices. While blanks may be also formed in accordance with prior art hot pressing techniques, cold pressing and sintering is preferred for economic reasons.

If the blank is consolidated by cold pressing and sintering, a small amount of paraffin is usually included in the powdered composition prior to pressing. The amount included is usually between about 4 and about 10% by weight. After cold pressing, the blank is vacuum sintered in accordance with well known prior art sintering techniques. Inserts consisting essentially of alumina, titanium diboride and zirconia having desirable properties are preferably consolidated by cold pressing and sintering at temperatures of between about 1550 degrees and about 1750 degrees C. Inserts having a composition of 82.7 percent alumina, 9.2 percent zirconia and 8.0 weight percent titanium diboride have been satisfactorily sintered in a cycle wherein the temperature was raised from 1450 degrees C. to 1570 degrees C. in one hour then allowed to drop. The density achieved was 4.33 grams per cubic centimeter which compares favorably to the maximum density which has been obtained with this composition of 4.39 g/cm$^3$.

It appears to be preferable to avoid the use of too "hard" a vacuum during sintering. In particular, it appears that pressures on the order of 250 to 5000 microns are sufficient and that pressures lower than about 100 microns tend to promote the formation of excessive amounts of glassy phase on the surface of the insert. Because of the reactivity of titanium diboride, air sintering does not appear to be practicable.

Typically, the blanks are pressed into a shape roughly equivalent to the desired shape and after consolidation are ground to finished configuration. After finish grinding, the consolidated ceramic inserts produced are readily adaptable for a variety of cutting tools and cutting tool insert applications including turning, facing, boring, milling, and the like. The ceramic cutting tool blanks can readily be fabricated in a variety of geometries in accordance with known cutting tool configurations to provide for optimum cutting efficiency in accordance with its intended end use.

Cutting tools composed of the ceramic composition of the present invention possess high toughness, excellent wear resistance and unusual resistance to chipping and cracking which properties are comparable, in many instances, and superior in some instances, to those of substantially pure alumina in metal cutting operations. In particular, the combination of high resistance to high speed wear and high chip resistance in a cold pressed insert provides a cutting tool with properties which have been needed for a long time.

In order to further demonstrate the unexpected properties of cutting tools and inserts composed of the ceramic material of the present invention, a series of machining tests including tool wear tests were conducted in comparison to prior art ceramic cutting tool materials including substantially pure alumina as well as commercial mixtures of alumina and titanium carbide. Throughout this application, unless stated to the contrary, the ceramic materials tested were in the form of a cutting tool insert having a standard SNG 434 shape with 0.006 inch by 30 degrees chamfers. Where inserts are formed by cold pressing, unless stated to the contrary, it is to be understood that approximately 8% wax (by weight) was added to the powdered mix and that the inserts were vacuum sintered at approximately 1550 degrees to 1750 degrees C.

One test used comprises a facing test in which a bar of pre-machined hot rolled AISI type 4150 steel is faced at constant rpm from 7 inches initial diameter down to a final diameter of 2.75 inches. The depth of cut of 0.060 inch is effected at a feed rate of 0.014 inch per revolution. The cutting edge is inspected at intervals and the wear recorded. This test is usually stopped at 50 to 60 cuts as little additional information is gained by further cuts since the wear at 50 to 60 cuts seems to provide a reliable indication of the wear resistance obtained in practical use. When optimally sintered, the more preferred materials of the present invention will survive from 50 to 60 cuts without chipping, fracturing or developing excessive wear. This performance is substantially equivalent to the results obtained with the best of the presently commercially available ceramics and significantly superior to most commercially available ceramic cutting tools. Compositions containing 30% $TiB_2$ wear out in less than about 40 cuts.

In order to further illustrate the ceramic cutting tool material of the present invention and the improved cutting characteristics thereof, the following examples are provided. It will be understood that the examples are provided for illustrative purposes and are not intended to be limiting of the composition as herein disclosed and as set forth in the subjoined claims.

EXAMPLE 1

For comparative purposes, a large number of commercially available SNG 434 shape ceramic cutting inserts reportedly consisting essentially a hot pressed mixture of 25.7 volume percent titanium carbide and 74.3 volume percent alumina, hereinafter designated as Composition A, were subjected to the above described facing test. Similarly, a large number of commercially available SNG 434 shape ceramic cutting inserts reportedly consisting essentially of cold pressed and sintered mixtures of alumina and up to about 2% zirconia, (hereinafter designated as Composition B) were also subjected to this facing test. Of the inserts of Composition A, only those coming from a particular manufacturer were consistently capable of surviving 50 to 60 cuts on the facing test while most fall short of that mark by considerable margins. Similarly, of the inserts of Composition B, only those coming from another particular manufacturer were consistently capable of surviving 50 to 60 cuts while the majority fell short.

EXAMPLE 2

The procedure of Example 1 was repeated using inserts of types C through I, which had been formed by cold pressing and sintering a mixture of 82.7 percent alumina, 9.2 weight percent zirconia and 8.0 weight percent titanium diboride. Each of test Compositions C through I was prepared by uniformly blending carefully measured quantities of the several constituents in a ball mill for a period of about nine hours in water. The average particle size of the resultant powder mixture was less than about 2 microns. The blended powder mixture (containing about 6 weight percent parafin) was thereafter carefully measured into dies, cold pressed, then vacuum sintered in a furnace by raising the temperature to that indicated in Table I and maintaining that temperature for the time indicated. Where a holding time of 0 is indicated, the furnace was allowed to begin cooling as soon as the indicated temperature was achieved. The resultant test compositions were ground into cutting inserts of a standard SNG 434 configuration. The results of these tests, as reported in Table I, demonstrate that the inserts of the present invention are superior to the majority of the presently available compositions and perform comparably to the best of the hot pressed alumina-titanium carbide containing inserts. When this example is repeated using 9.2% $ZrO_2$; 3% $TiB_2$; 0.6% $TiO_2$; 0.1% MgO, and 87.1% $Al_2O_3$, substantially equivalent results are obtained. If the compositions are made without $TiO_2$ or other sintering aid, there seems to be difficulty in obtaining an optimum product consistently.

EXAMPLE 3

The procedure of Example 2 is repeated using inserts of types J through M of a composition containing 88 percent alumina, 7.4 percent zirconia and 4.6 percent titanium diboride. The sintering cycles and results are reported in Table II.

EXAMPLE 4

The procedure of Example 2 is repeated using inserts of types N and O consisting of 85 percent alumina, 8.3 percent titanium diboride and 6.7 percent zirconia. The sintering cycles and results are reported in Table III.

EXAMPLE 5

The procedure of Example 2 is repeated using 78.3 percent alumina, 13.8 percent titanium diboride, 5.9 percent zirconia and 1.9 percent titanium dioxide. These inserts were sintered at 1650 degrees C. for 1 hour and when tested, were capable of surviving more than 40 cuts in the facing test. The wear at 40 cuts was found to be 0.0110 inches.

TABLE I

| Composition | Sintering Cycle | Number of Cuts Survived | Wear at Cuts Indicated |
|---|---|---|---|
| A | — | Highly variable See Example 1 | — |
| B | — | Highly variable See Example 1 | — |
| C | 1550 C 45 min. hold | 60 | — |

TABLE I-continued

| Composition | Sintering Cycle | Number of Cuts Survived | Wear at Cuts Indicated |
|---|---|---|---|
| D | 1650 C No hold | 58 | 0.015 |
| E | 1560 C 15 min. hold | 50 | 0.0117 |
| F | 1700 C No hold | 50 | 0.0128 |
| G | 1700 C No hold | 60 | — |
| H | 1750 C No hold | 60 | 0.0145 |
| I | 1750 C 15 min. hold | 60 | — |

TABLE II

| Composition | Sintering Cycle | Number of Cuts Survived | Wear at Cuts Indicated |
|---|---|---|---|
| J | 1550 C 45 min. hold | 20 | 0.0088 |
| K | 1650 C 15 min. hold | 50 | 0.0122 |
| L | 1750 C No hold | 50 | 0.015 |
| M | 1750 C 15 min. hold | 13 | — |

TABLE III

| Composition | Sintering Cycle | Number of Cuts Survived | Wear at Cuts Indicated |
|---|---|---|---|
| N | 1550 C 45 min. hold | 35 | Chipped 0.0120 @ 30 cuts |
| O | 1650 C 15 min. hold | 50 | 0.0124 |

EXAMPLE 6

To demonstrate the unexpected toughness of the inserts of the present invention, the end of a 2.00 inch diameter bar of clean, class 40 grey iron was face milled using a 6 inch fly cutter at a depth of cut of 1/16 inch, a speed of 1400 surface feet per minute, and a feed per tooth of 0.0056 inches. The inserts used were of shape SNG 434 and a 0.008 inch chamfer at 20 degrees. Inserts of compositions A, B, and E were tested. The inserts of composition B were capable of surviving 8 to 16 cuts in this face milling test prior to fracture. The inserts of compositions A and E were still useable after 48 cuts in this test. When examined microscopically, the appearance of the edges of the cold pressed inserts of the present invention was comparable to the appearance of the edges of the hot pressed inserts. Although the condition of the hot pressed inserts was somewhat better than that of the cold pressed, even surviving this test and so being roughly comparable is a remarkable achievement for a cold pressed insert.

EXAMPLE 7

The procedure of Example 6 was repeated using inserts having the composition 9.2% $ZrO_2$; 3.0% $TiB_2$; 0.6 $TiO_2$; 0.1% MgO and 87.1 $Al_2O_3$. As a control, inserts of composition B were also tested. After 16 cuts, it was found that the inserts of the present invention exhibited only slight chipping in that all chips were less than 0.005 inch in size while of 9 inserts of composition B, only one had chips between 0.005 and 0.010 inch in size, two had chips between 0.010 and 0.015 inch in size and the rest had failed by fracture.

Thus, it is apparent from these examples that the inserts of the present invention provide a new and surprising combination of wear resistance and toughness which has important advantages over the best of the prior art cold pressed and sintered cutting tool compositions in that these new compositions provide superior toughness and strength while maintaining wear resistance at a high level.

As our invention we claim:
1. An insert for a cutting tool consisting essentially of:
   from about 1 to about 15% zirconia;
   up to about 2% magnesia;
   from about 5% to about 20% titanium diboride;
   up to about 10% titanium dioxide; and
   from about 60% to about 94% alumina.
2. The insert of claim 1, wherein said insert is formed by the process of cold pressing and sintering.
3. An insert for a cutting tool consisting essentially of:
   from about 4 to about 12% zirconia;
   from about 5 to about 20% titanium diboride; and
   from about 68% to about 91% alumina.
4. The insert of claim 3, wherein said insert is formed by the process of cold pressing and sintering.
5. An insert for a cutting tool consisting essentially of:
   from about 4 to about 20% zirconia;
   from about 0.5% to about 15% titanium diboride;
   up to about 10% grain growth inhibiting sintering aid; and
   from about 60% to about 95% alumina.
6. An insert according to claim 5, wherein the amount of zirconia is between about 6 and about 15%, the amount of titanium diboride is between about 1 and about 15% and the grain growth inhibiting sinerting aid contains up to about 2% titania and up to about 0.5% magnesia.
7. An insert according to claim 6 wherein the amount of titanium diboride is between about 1% and about 12%.
8. An insert according to claim 5 wherein the amount of zirconia is between about 6% and about 15%, and the amount of titanium diboride is between about 2 and about 12%.
9. An insert for a cutting tool consisting essentially of:
   from about 2 to about 15% zirconia;
   up to about 10% sintering aid;
   from about 6% to about 20% titanium diboride; and
   from about 65% to about 94% alumina.
10. An insert according to claim 9 wherein the amount of zirconia is between about 3 and 12% and the amount of titanium diboride is between about 6 and about 15%.
11. An insert according to claim 9 wherein the grain growth inhibiting sintering aid includes up to about 10% titania and up to about 2% magnesia.
12. An insert for a cutting tool consisting essentially of:
   from about 2 to about 4% titanium diboride;
   from about 6 to about 12% zirconia;
   up to about 2% grain growth inhibiting sintering aid; and
   from about 85 to about 90% alumina.
13. An insert according to claim 12 wherein said grain growth inhibiting sintering aid consists essentially of up to about 1.5% titania and up to about 0.5% magnesia.
14. An insert according to claim 13 wherein the amount of titania is between about 0.3 and 0.9% and the amount of magnesia is between about 0.01 and 0.5%.

* * * * *